(12) United States Patent
Katsuragawa

(10) Patent No.: US 6,187,431 B1
(45) Date of Patent: Feb. 13, 2001

(54) MAGNETIC RECORDING MEDIUM

(75) Inventor: Tadao Katsuragawa, Kanagawa (JP)

(73) Assignee: Ricoh Company, Ltd., Tokyo (JP)

( * ) Notice: Under 35 U.S.C. 154(b), the term of this patent shall be extended for 0 days.

(21) Appl. No.: 09/205,781

(22) Filed: Dec. 4, 1998

(30) Foreign Application Priority Data

Dec. 5, 1997 (JP) .................................................. 9-352348
Dec. 4, 1998 (JP) ................................................ 10-345917

(51) Int. Cl.$^7$ ...................................................... G11B 5/66
(52) U.S. Cl. .................. 428/332; 428/336; 428/694 ML; 428/694 SG; 428/694 TR; 428/694 BR; 428/900
(58) Field of Search ..................... 428/694 ML, 694 SG, 428/694 TR, 694 BR, 900, 332, 336

(56) References Cited

U.S. PATENT DOCUMENTS

| | | | |
|---|---|---|---|
| 5,112,701 | 5/1992 | Katsuragawa | ................. 428/694 NF |
| 5,554,451 * | 9/1996 | Taki | ............................... 428/694 ML |
| 5,626,965 * | 5/1997 | Iide | ....................................... 428/332 |
| 5,640,374 * | 6/1997 | Hirokane | ................................ 369/13 |
| 5,673,251 * | 9/1997 | Suzuki | ............................... 369/275.4 |
| 5,700,540 * | 12/1997 | Farruggia | ............................. 428/641 |
| 5,976,667 * | 11/1999 | Hiroki | .................................. 428/141 |

* cited by examiner

*Primary Examiner*—Leszek Kiliman
(74) *Attorney, Agent, or Firm*—Cooper & Dunham LLP

(57) ABSTRACT

A magnetic recording medium has a transparent substrate with a plurality of grooves which extend parallel with each other at regular intervals, each of the grooves having inner side walls perpendicular to the transparent substrate and a space between adjacent side walls being constant, a magnetic material layer extending in the form of a stripe, provided on the surface of the inner side walls of each of the grooves, and a pair of dielectric multi-layers which are disposed so as to sandwich the transparent substrate therebetween.

19 Claims, 3 Drawing Sheets

(a)

(e)

(b)

(f)

(c)

(g)

(d)

MAGNETIC RECORDING MEDIUM

BACKGROUND OF THE INVENTION

1. Field of the Invention

The present invention relates to a magnetic recording medium, and in particular to a magnetic recording medium which is capable of repeatedly carrying out recording, reading and erasing operations through magnetic heads, and suitable for a display device for displaying recorded images by applying light and a magnetic field to the magnetic recording medium.

2. Discussion of Background

A magnetic material which can exhibit the magneto-optical effects, such as Faraday effect and magnetic Kerr effect is conventionally used for the magneto-optical disk memory capable of recording, reading and erasing information.

A magnetic recording medium which employs the above-mentioned magnetic material with the magneto-optical effects can record an image therein, for example, through a magnetic head. Further, by utilizing the Faraday effect and Kerr effect of the above-mentioned magnetic material obtained by the application of light thereto, the application of the above-mentioned magnetic recording medium to a display device for displaying the recorded image has been studied.

However, there is not obtained any magnetic recording medium that can repeatedly carry out the recording, reading and erasing operations through the magnetic heads, and in addition to the above, that can display the recorded image with high contrast.

SUMMARY OF THE INVENTION

Accordingly, an object of the present invention is to provide a magnetic recording medium which is capable of repeatedly carrying out the recording, reading and erasing operations through the magnetic heads, and further, is applicable to a display device that can display the recorded image with high contrast.

The above-mentioned object of the present invention can be achieved by a magnetic recording medium comprising a transparent substrate with a plurality of grooves which extend parallel with each other at regular intervals, each of the grooves having inner side walls perpendicular to the transparent substrate and a space between adjacent side walls being constant, a magnetic material layer extending in the form of a stripe, provided on the surface of the inner side walls of each of the grooves, and a pair of dielectric multi-layers which are disposed so as to sandwich the transparent substrate therebetween.

The aforementioned magnetic recording medium may further comprise a pair of polarizing layers, each disposed on an external side of each of the dielectric multi-layers.

The above-mentioned object of the present invention can also be achieved by a magnetic recording medium comprising a substrate with a plurality of grooves which extend parallel with each other at regular intervals, each of the grooves having inner side walls perpendicular to the substrate and a space between adjacent side walls being constant, a magnetic material layer extending in the form of a stripe, provided on the surface of the inner side walls of each of the grooves, a dielectric multi-layer which is provided on one surface of the substrate, a polarizing layer which is provided on the dielectric multi-layer, and a light reflection layer which is provided on the other surface of the substrate, opposite to the dielectric multi-layer with respect to the substrate.

It is preferable that each of the grooves have a depth of 0.1 to 5 $\mu$m, the space between adjacent side walls be in a range of 0.2 to 2.0 $\mu$m, and the magnetic material layer have a thickness of 5 to 100 nm.

It is preferable that the dielectric multi-layer comprise a plurality of laminated dielectric material layers.

Furthermore, an organic material is preferably used for the preparation of the dielectric material layers.

In addition, it is preferable that the magnetic material layer comprise a magnetic material selected from the group consisting of Fe, Co, Ni and an alloy thereof. Such magnetic materials may be used in the form of ultrafine particles with an average particle diameter of 20 to 200 Å.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
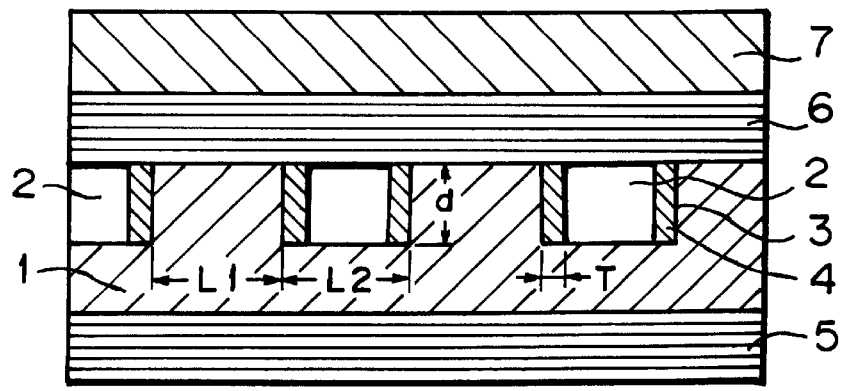
FIG. 1 is a schematic cross-sectional view of a magnetic recording medium in accordance with one embodiment of the present invention.

FIG. 1 is a schematic cross-sectional view of a magnetic recording medium in accordance with one embodiment of the present invention. In the magnetic recording medium shown in FIG. 1, a transparent substrate 1 bears thereon a plurality of grooves 2, preferably having a depth (d) of 0.1 to 5 $\mu$m, the grooves 2 extending parallel with each other at regular intervals. Each of the grooves 2 has inner side walls 3 perpendicular to the transparent substrate 1, and a space ($L_1$) or ($L_2$) between adjacent side walls 3 is constant, preferably within the range of 0.2 to 2.0 $\mu$m. Further, a magnetic material layer 4 extending in the form of a stripe is disposed on the surface of the above-mentioned inner side walls 3 of each groove 2. The thickness (T) of the magnetic material layer is preferably in the range of 5 to 100 nm.

In addition, a pair of dielectric multi-layers 5 and 6 are disposed so as to sandwich the transparent. substrate 1 therebetween. In FIG. 1, the dielectric multi-layer 6, which is supported by another transparent substrate 7, is attached to the transparent substrate 1.

The transparent substrate 1 or 7 may be a molded substrate of an organic material or an inorganic material.

Specific examples of such organic and inorganic materials for use in the substrate include acrylic resin such as polyacrylate, polymethacrylate, polyacrylic acid and polyacrylamide, polycarbonate resin, styrene resin such as polystyrene and ABS (acrylonitrile butadiene styrene) resin, polysulfone, polyether sulfone, polypropylene resin, polyallylate, epoxy resin, poly-4-methylpentene-1, fluorinated polyimide, fluorine-containing resin, phenoxy resin, polyolefin resin, diethylene glycol bisallyl carbonate, nylon resin, fluorene polymer, cellulose acetate, glass, quartz, and alumina.

It is proper that the thickness of the transparent substrate 1 be 1 mm or less, and more preferably in the range of 50 to 500 μm. As the thickness of the substrate 1 decreases, the obtained recording medium is preferred because the magnetic material layer becomes closer to the magnetic head.

For the magnetic material layer 4, magnetic materials which can exhibit large magneto-optical effects such as Faraday effect and Kerr effect, and have magnetic anisotropy in the plane of the magnetic material layer 4, and a coercive force of 300 to 2000 Oe are preferably employed.

As the above-mentioned magnetic materials, there can be employed terromagnetic materials such as iron (Fe), cobalt (Co), nickel (Ni) and alloys thereof. Those metals and alloys thereof have large magneto-optical effects. When those metals and alloys thereof are used in the form of ultrafine particles, the obtained magnetic material layer 4 can be provided with the magnetic anisotropy in the plane thereof, and sufficient coercive force. In this case, it is desirable that the average particle size of the ultrafine particles of the metals of alloys thereof be in the range of 20 to 200 Å. In other words, the coercive force of the magnetic material layer 4 can be freely changed by controlling the partitle size of the ultrafine particles of Fe, Co, Ni or alloys thereof for use in the magnetic material layer 4.

When the magnetic material layer 4 comprises the ultrafine particles of the ferromagnetic materials such as Fe, Co, Ni and alloys thereof, recording and erasing of information can be easily carried out, and further, the recorded information can be clearly displayed with high contrast when the recording medium is used as the display device.

Using the ultrafine particles of Fe, Co, Ni or an alloy thereof, the magnetic material layer 4 can be formed by evaporation under gaseous atmosphere mixed with a small amount of air (e.g., several 100 m-Torr) in the evaporation chamber.

Each of the dielectric multi-layer 5 or 6 comprises a plurality of laminated dielectric material layers. For instance, to prepare the dielectric multi-layer, a large refractive index dielectric material layer and a small refractive index dielectric material layer are alternately laminated, with the optical thickness of each dielectric material layer being the same (λ/4).

A material that is transparent in the visible spectral region is preferably used for preparation of the dielectric multi-layers 5 and 6. Specific examples of the inorganic material for use in the dielectric multi-layer are $Na_3AlF_6$, $MgF_2$, $SiO_2$, SiO, $Al_2O_3$, $CeF_3$, $PdF_2$, $Nd_2O_3$, $ZrO_2$, $TiO_2$, $CeO_2$ and ZnS.

When the organic material is employed for preparation of the dielectric multi-layers 5 and 6, any organic materials can be employed as long as they do not exhibit absorption with respect to the visible light range. Specific examples of the organic material for the preparation of the dielectric multi-layers 5 and 6 include acrylic resin such as polyacrylate, polymethacrylate, polyacrylic acid and polyacrylamide, polycarbonate resin, styrene resin such as polystyrene and ABS resin, polysulfone, polyether sulfone, polypropylene resin, polyallylate, epoxy resin, poly-4-methylpentene-1, fluorinated polyimide, fluorine-containing resin, phenoxy resin, polyolefin resin, diethylene glycol bisallyl carbonate, nylon resin, fluorene polymer, and cellulose acetate.

By employing the above-mentioned organic materials for preparation of the dielectric multi-layers 5 and 6, the dielectric multi-layers 5 and 6 can be provided by, for example, coating method, without using a large-sized vacuum apparatus. Further, if the vacuum deposition is not carried out, it is not necessary to heat the substrate in the course of the formation of the dielectric multi-layer. Therefore, the substrates 1 and 7 made of plastic materials can be used, with the result that the magnetic recording medium can be made flexible.

The number of laminated dielectric material layers for use in the dielectric multi-layer is preferably in the range of 2 to 50 layers. To obtain high contrast of the recorded image and to reduce the manufacturing cost, it is more preferable that the number of laminated dielectric material layers be in the range of 6 to 10 layers. The thinner the dielectric multi-layer 5 or 6, the more easily the magnetic field can reach the magnetic material layer 4 in the course of recording.

Furthermore, it is preferable that the transparency of the dielectric multi-layers 5 and 6 be 50% or more, that is, the reflectance thereof be less than 50%.

Figure 2:
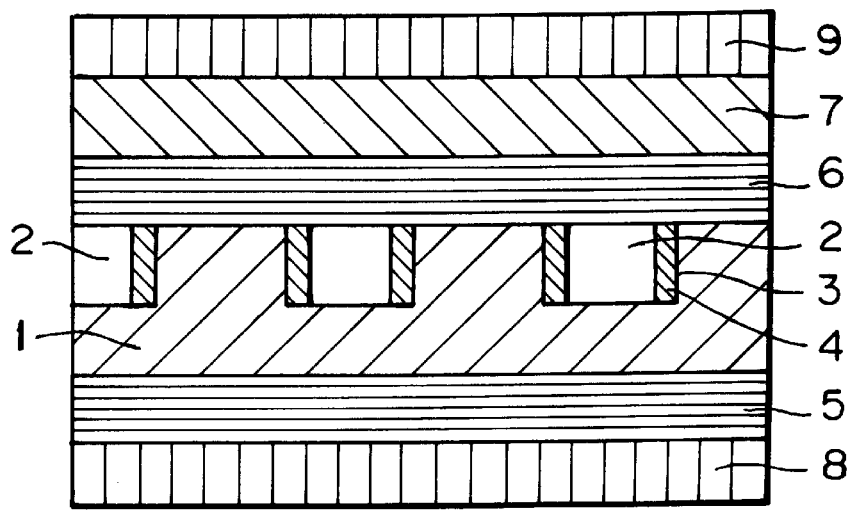
FIG. 2 is a schematic cross-sectional view of a magnetic recording medium in accordance with another embodiment of the present invention.

FIG. 2 is a schematic cross-sectional view of a magnetic recording medium in accordance with another embodiment of the present invention. In FIG. 2, polarizing layers 8 and 9 are respectively disposed on the external side of the dielectric multi-layers 5 and 6 shown in FIG. 1. As the polarizing layers 8 and 9, commercially available film-shaped iodine-containing polarizers are usable.

Figure 3:
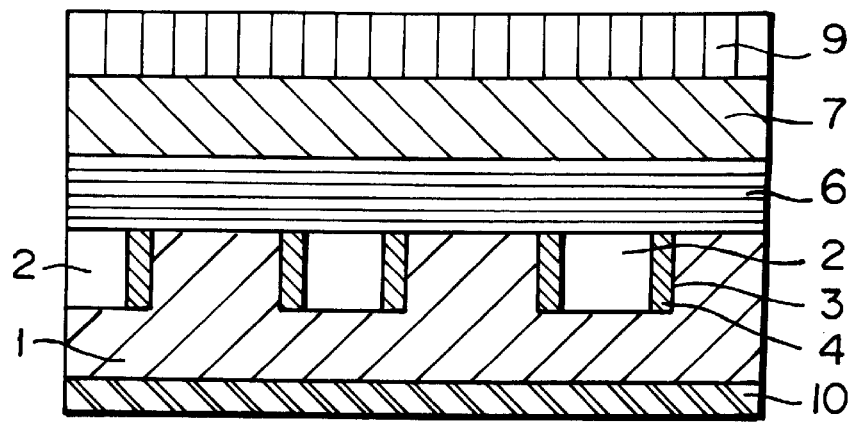
FIG. 3 is a schematic cross-sectional view of a magnetic recording medium in accordance with a further embodiment of the present invention.

FIG. 3 is a schematic cross-sectional view of a magnetic recording medium in accordance with a further embodiment of the present invention. The magnetic recording medium of FIG. 3 comprises a substrate 1 which bears thereon a plurality of grooves 2, each groove preferably having a depth of 0.1 to 5 μm. The grooves 2 extend parallel with each other at regular intervals, and each of the grooves 2 has inner side walls 3 perpendicular to the substrate 1. The space between the adjacent side walls is constant, preferably within a range of 0.2 to 2.0 μm. A magnetic material layer 4 extending in the form of a stripe is disposed on the side walls 3 of each groove 2. The thickness of each magnetic material layer 4 is preferably in the range of 5 to 100 nm. Further, a dielectric multi-layer 6 which is provided on a substrate 7 is attached to one surface of the substrate 1, a polarizing layer 9 is overlaid on the substrate 7, and a light reflection layer 10 is provided on the other surface of the substrate 1, opposite to the dielectric multi-layer 6 with respect to the substrate 1.

The material for use in the light reflection layer 10 may exhibit a high reflectance in the particular visible spectral region. Specific examples of the material for use in the light reflection layer 10 include Cu, Al, Ag, Au, Pt, Rh, $TeO_x$, TeC, SeAs, TeAs, TiN, TaN and CrN.

The light reflection layer 10 may be formed by the conventional film formation method such as vacuum deposition, sputtering or ion-plating method. It is preferable that the light reflection layer 10 have a thickness in the range of 500 to 1000 Å.

In addition, there can be used as the light reflection layer 10 an alternating multi-layer prepared by laminating a plurality of metal thin films and dielectric material thin films, and a hologram reflecting plate, for instance, a commercially available product "HoloBright" (Trademark), made by Nippon Polaroid Kabushikikaisha.

Since the magnetic recording medium shown in FIG. 3 comprises the light reflection layer 10, the quality of the recorded image has no connection with the transmission of the substrate 1. Therefore, a transparent substrate is not always necessary in the magnetic recording medium as shown in FIG. 3. To be more specific, a substrate 1 which exhibits a visible light transmission of about 70% or less is usable in this embodiment.

The image recorded in the magnetic recording medium as shown in FIG. 3 is visible as a reflected image, so that this type of magnetic recording medium can be used as the image display device without illuminating the recording medium with a backlight. As a result, there can be obtained a compact and portable magnetic recording medium which can serve as the image display device.

When the magnetic recording medium of the present invention is used as the display device, it is particularly desirable that a light reflection preventing layer be provided on the outermost layer of the recording medium on the side of incidence of light, opposite to the side of the light reflection layer. Namely, as shown in FIG. 3, the light reflection preventing layer (not shown) may be provided on the polarizing layer 9. By the provision of the light reflection preventing layer, not only the light transmittance can be increased, but also the surface of the recording medium can be protected from chemical corrosion and chemical change which may take place by the application of light to the recording medium.

The method of fabricating the magnetic recording medium according to the present invention as illustrated in FIG. 1, 2 or 3 comprises the steps of:

(1) forming a plurality of grooves 2 which extend parallel with each other on a substrate 1 by photolithography;

(2) providing a thin layer comprising the ferromagnetic substance (hereinafter referred to as a magnetic thin layer) on the whole grooved surface of the substrate 1;

(3) removing some portions of the magnetic thin layer provided by the step (2) from the grooved surface of the substrate 1 by etching so that the magnetic thin layer may be retained only on the surface of the two facing inner side walls of each groove, thereby forming a magnetic layer 4 which is disposed on each side wall;

(4) providing a dielectric multi-layer 5 (as shown in FIGS. 1 and 2) or a light reflection layer 10 (as shown in FIG. 3) on the back side of the substrate 1;

(5) attaching a dielectric multi-layer 6 which is provided on a substrate 7 to the grooved surface of the substrate 1, opposite to the side of the dielectric multi-layer 5 or the light reflection layer 10 with respect to the substrate 1; and (6) disposing polarizing layers 8 and 9' respectively on the external side of the dielectric multi-layers 5 and 6 so as to sandwich the dielectric multi-layers 5 and 6 therebetween, as illustrated in FIG. 2, or providing a polarizing layer 9 on the external side of the dielectric multi-layer 6, as illustrated in FIG. 3.

Figure 4:
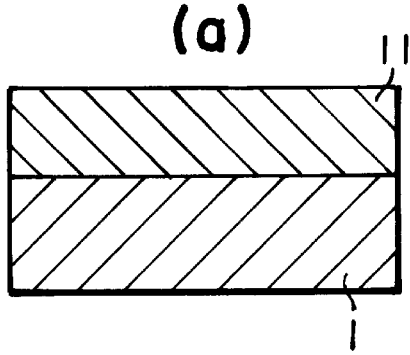
FIG. 4 is a diagram in explanation of the steps of providing grooves on the surface of a substrate and forming a magnetic material layer on the inner side walls at each groove.
Figure 4:
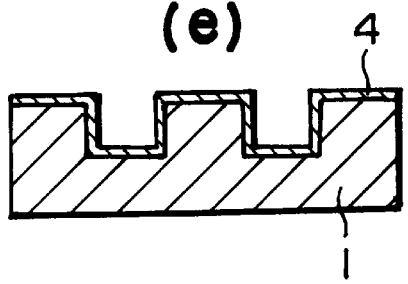
Figure 4:
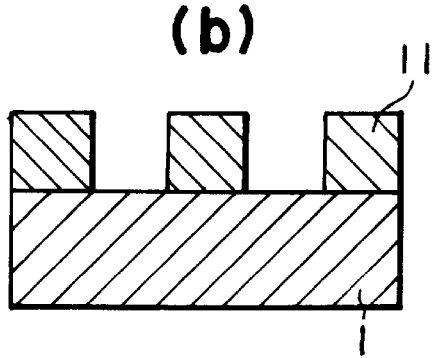
Figure 4:
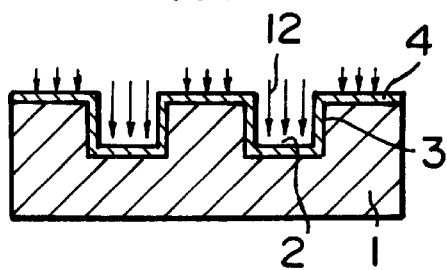
Figure 4:
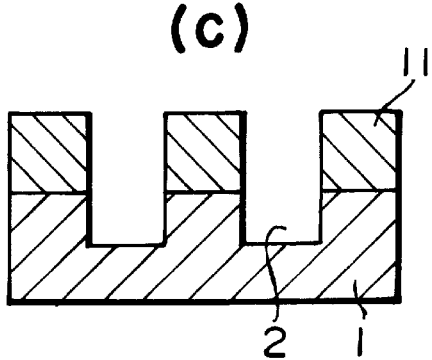
Figure 4:
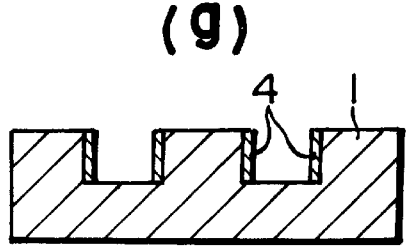
Figure 4:
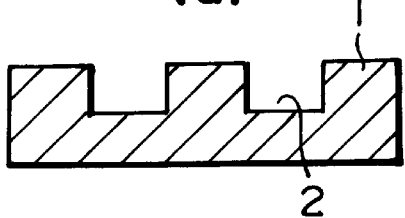

FIG. 4 shows one embodiment of the process for forming the grooves 2 on the substrate 1 and providing the magnetic material layer 4 on the surface of the two facing inner side walls 3 of each groove 2.

As shown in FIG. 4(a), a layer of a photoresist material, which is hereinafter referred to as a resist layer 11, is formed on a substrate 1 which is, for example, made of quartz.

A photomask which has a striped pattern, with the stripes being arranged in parallel with each other at regular intervals is placed on the thus formed resist layer 11, and exposed to ultraviolet light. The UV-exposed surface is then subjected to wet etching, so that a grooved pattern is formed in the surface of the resist layer 11 corresponding to the striped patter of the photomask, as shown in FIG. 4(b).

Thereafter, grooves 2 each having a predetermined depth extending from the grooved pattern formed in the resist layer 11 are formed on the surface of the substrate 1 by etching the substrate 1, as shown in FIG. 4(c).

Then, the resist layer 11 is peeled away from the substrate 1, thereby obtaining the substrate with grooves 2, as shown in FIG. 4(d). Through the above-mentioned steps, a plurality of grooves 2 can be relatively easily formed so as to have a depth (up to about 10 microns) vertically to the surface of the substrate 1. In addition, fine grooves with excellent straightness and smooth edges can be formed by lithography.

When a transparent plastic plate is used as the substrate 1, a transparent thin layer of $SiO_2$ may be overlaid on the plastic substrate 1 by physical vapor deposition (PVD) in advance. Thereafter, the groove 2 may be formed on the surface of the $SiO_2$ thin layer. Alternatively, a resin substrate with grooves can be molded as a replica using an original quartz substrate provided with grooves.

A magnetic material layer 4 is throughout coated on the grooved surface of the substrate 1, as shown in FIG. 4(e). The method of forming the magnetic material layer 4 is not particularly limited, and physical vapor deposition (PVD), chemical vapor deposition (CVD) or plating is usable.

The thus formed thin film of the magnetic material layer 4 is subjected to a sputtering process using Ar ions 12 to remove the portions of the magnetic material layer 4 on horizontal faces of the grooved substrate 1 so that the magnetic material layer 4 remains only on the surface of two facing inner side walls 3 of each groove 2 as shown in FIG. 4(f). Although the method of removing a part of the magnetic material layer 4 includes dry and wet methods, the above-mentioned Ar ion sputtering is preferably used over other methods, wherein the sputtering is preferably carried out under the reverse biased condition with a negative voltage applied to a substrate electrode. Thus, a magnetic material layer 4 can be provided on the surface of the two facing inner side walls 3 of each groove 2 perpendicularly to the substrate 1 as shown in FIG. 4(g).

To record image information in the magnetic recording medium of the present invention, a magnetic field may be applied to the magnetic material layer 4 in the vertical direction to the substrate 1 corresponding to the image information, for example, using a bar magnet or a magnetic head such as a vertical magnetic head employing an inductance coil.

To erase the recorded information, a magnetic field may be uniformly applied to the magnetic material layer 4 so as to magnetize the whole magnetic material layer 4 in the same direction, for instance, in the upward, downward or horizontal direction when viewed in the direction perpendicular to the surface of the substrate 1. Alternatively, with the application of an AC magnetic field, the bar magnet or the magnetic head may be withdrawn from the surface of the magnetic recording medium until the magnetic field applied to the recording medium is extinguished.

Alternatively, a laser beam is imagewise applied to heat the recording medium with the application of a bias field thereto so as to record information in the magnetic recording medium of the present invention. When the recorded information is erased from the recording medium, the laser beam may be also applied to the recording medium, with the bias field being applied to the recording medium in the direction opposite to that for the above-mentioned recording operation.

When the magnetic recording medium of the present invention is used as the image display device, the recorded image can be displayed in the recording medium of the present invention by the following principle.

Figure 5:
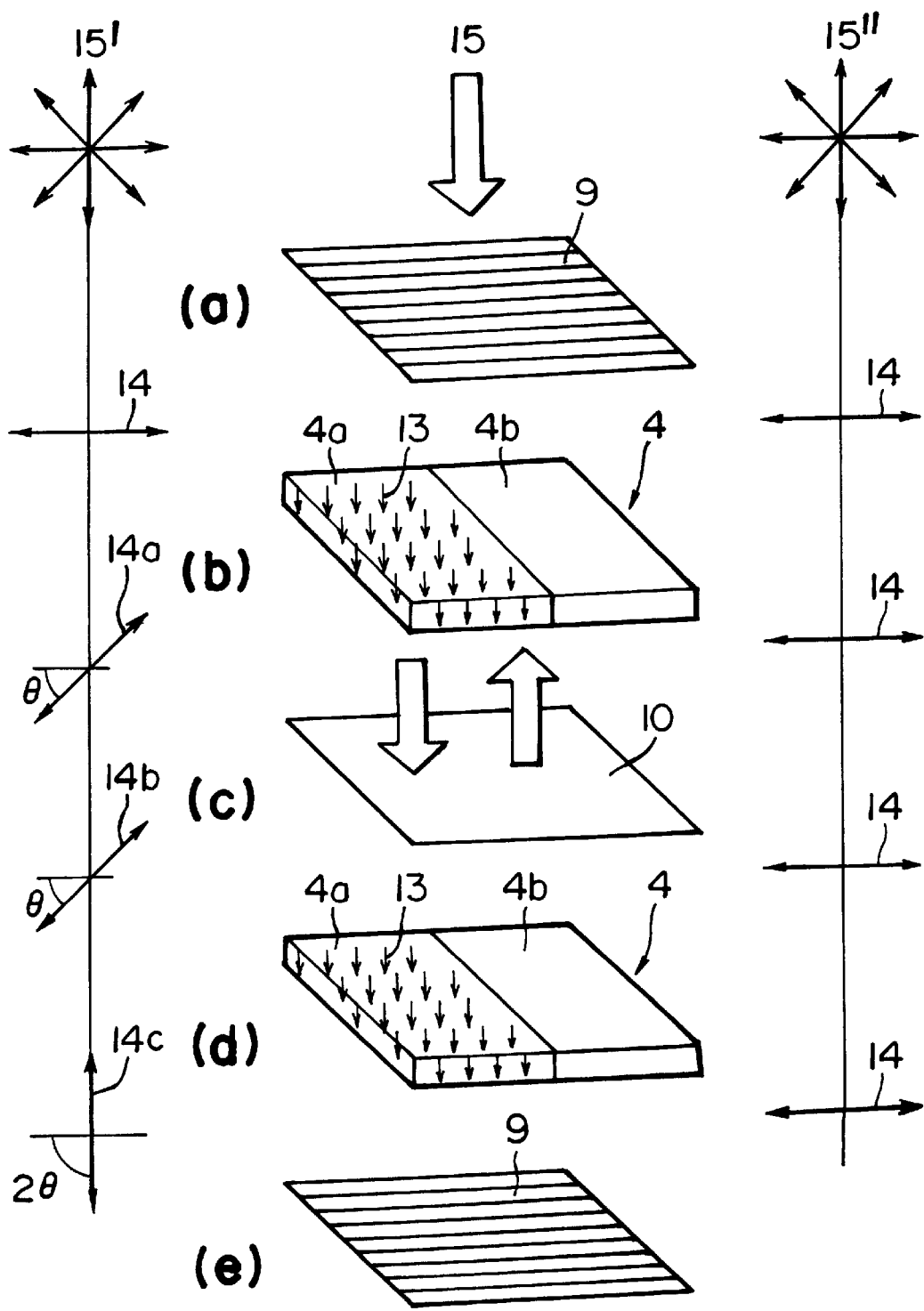
FIG. 5 is a diagram in explanation of the principle of image display when a magnetic recording medium of the present invention is used as the image display device.

FIG. 5 is a schematic diagram which explains the manifestation of the image contrast of an image recorded in the magnetic recording medium of reflection type as shown in FIG. 3.

In a magnetic material layer 4 shown in FIG. 5, an image area 4a is magnetized in a direction of arrow 13 perpendicular to the surface of the magnetic material layer 4 using a bar magnet or a magnetic head. On the other hand, a non-image area 4b is not magnetized.

When a light beam 15 strikes the surface of a polarizing layer 9 as shown in FIG. 5(a), the light having a plane of polarization 14 which can pass through the polarizing layer 9 enters the magnetic material layer 4 via a dielectric multi-layer (not shown). A light beam 15' shown in FIG. 5 is incident on the image area 4a; while a light beam 15' is incident on the non-image area 4b.

The plane of polarization 14 of the light 15' which has struck the magnetized image area 4a is rotated at a Faraday rotational angle ($\theta$), as shown in FIG. 5(b). Thus, the light with the plane of polarization 14a is reflected by the light reflection layer 10. In contrast to this, the plane of polarization 14 of the incident light 15" which has struck the non-image area 4b is not rotated, and the light with the plane of polarization 14 is reflected by the light reflection layer 10 as it is.

The plane of polarization 14b of the light 15' is not changed when the light strikes the light reflection layer 10 and is reflected thereby, as shown in FIG. 5(c). After reflected by the light reflection layer 10, the light 15' is again incident on the magnetic material layer 4, as a shown in FIG. 5(d). While passing through the magnetized image area 4a, the plane of polarization 14b is again rotated at a Faraday rotational angle ($\theta$). Thereafter, as shown in FIG. 5(e), the light with the plane of polarization 14c is directed toward the polarizing layer 9 via the dielectric multi-layer 6 (not shown). The rotational angle from the plane of polarization 14 to the plane of polarization 14c is $2\theta$ in total.

In this case, the plane of polarization 14c of the light 15' in FIG. 4(e) is in such a direction that cannot pass through the polarizing layer 9, so that the magnetized image area 4a appears dark and can be displayed as a dark portion.

The incident light 15" which has entered the non-magnetized non-image area 4b is directed toward the polarizing layer 9 via the dielectric multi-layer 6 (not shown), with the plane of polarization 14 being not rotated. Since the plane of polarization 14 is not changed, the light 15" can pass through the polarizing layer 9. As a result, the non-image area 4b appears light. As mentioned above, the magnetized image area 4a appears dark while the non-magnetized non-image area 4b becomes light, with the result that the image contrast can be manifested.

In the magnetic recording medium of the present invention, the magnetic material layer is disposed on the side wall of each groove in parallel with the direction of light. When the light passes through the air space between the two facing inner side walls on which the magnetic material layer 4 is disposed, or passes through the substrate portion between the adjacent grooves, it is considered that the light is reflected by the magnetized magnetic material layer 4. Consequently, the magneto-optical effect is remarkably enhanced and the rotational angle of the plane of polarization becomes large. Therefore, it is possible to display an image with high image contrast.

In the magnetic recording medium with such a structure as shown in FIG. 1 or 2, the substrate 1 with a plurality of grooves 2 is sandwiched between a pair of dielectric multi-layers 5 and 6. When the light passes through the air space between the two facing inner side walls on which the magnetic material layers 4 is disposed or the substrate portion between the adjacent grooves 2, the light trapped between the dielectric multi-layers 5 and 6 is considered to be reflected by the dielectric multi-layers 5 and 6. Therefore, the rotation of the plane of polarization is further amplified, thereby increasing the contrast of the image recorded in the recording medium.

Other features of this invention will become apparent in the course of the following description of exemplary embodiments, which are given for illustration of the invention and are not intended to be limiting thereof.

EXAMPLE 1

On the surface of a substrate with a thickness of 0.5 mm made of quartz, a thin layer of $Cr_2O_3$ and a thin layer of Cr were successively provided to have a total thickness of 120 nm, and a positive resist layer was further provided on the above two laminated thinlayers.

There was placed on the positive resist layer a photomask carrying many straight lines which extended parallel with each other with a space between adjacent lines being 1.0 $\mu$m and a width of each line being 1.0 $\mu$m. The photomask was exposed to UV light, and the resist layer was subjected to wet etching.

Further, using the thus formed pattern, the quartz substrate 1 was etched under a fluorine gas ambient, thereby forming in the surface of the quartz substrate 1 a plurality of grooves 2 with a width of 1.0 $\mu$m and a depth of 0.4 $\mu$m extending parallel with each other, with a space between the adjacent grooves being 1.0 $\mu$m. After the completion of the etching, the resist layer and the At two thin layers of $Cr_2O_3$ and Cr were removed from the quartz substrate 1.

Subsequently, a thin film of iron was deposited on the grooved surface of the quartz substrate 1 throughout by an evaporation method under gaseous atmosphere without heating the substrate 1. A mixture of argon (Ar) and the air was caused to flow into the evaporation chamber at the respective rates of 50 ccm and 5 ccm, and the total pressure was 1.3 Pa. Thus, a magnetic thin layer was coated on the entire grooved surface of the quartz substrate 1.

It was observed that the magnetic thin layer thus formed on the entire grooved surface of the substrate 1 was made of finely-divided particles of iron with an average particle diameter of 7 nm. The average thickness of the magnetic thin layer was 76 nm.

When a magnetic thin layer was independently formed on a glass plate in the same manner as mentioned above, the coercive force of the thus formed magnetic thin layer was 450 Oe, and a magnetic anisotropy was present in the plane direction.

The grooved quartz substrate 1 with the magnetic thin layer was then subjected to a sputtering process.

Using an ion etching apparatus, parts of the magnetic thin layer were removed from the grooved-surface of the substrate 1 so that only the magnetic thin layer attached to the side walls might remain with argon gas being introduced into the sputtering chamber, under the application of a voltage of −350 V to the substrate electrode (i,e., under the reverse biased condition). Thus, a magnetic material layer 4 was disposed on the two facing inner side walls of each groove, extending in the form of stripes.

The magneto-optical effect of the magnetic material layer 4 was measured using a magneto-optical effect measuring apparatus. As a result, the rotational angle of the plane of polarization was 16° when the light with a wavelength of 630 nm was employed, with the magnetic material layer 4 being magnetized by the application of a magnetic field of 15 kilogauss, followed by no application of magnetic field thereto.

Thereafter, a dielectric material layer of $SiO_2$ with a low refractive index of 1.46 and a dielectric material layer of $TiO_2$ with a high refractive index of 2.45 were alternately laminated by ion-plating method on the non-grooved surface of the quartz substrate 1, with the substrate 1 being heated at 400° C. Thus, a dielectric multi-layer 5 with a total thickness of 90 nm was provided. In this case, the number of the above-mentioned laminated dielectric material layers was 10.

A dielectric multi-layer 6 was provided on a quartz substrate 7 with a thickness of 0.5 mm in the same manner as mentioned above, and the dielectric multi-layer 6 was closely attached to the grooved surface of the substrate 1. The transmittance of the dielectric multi-layers 6 and 7 was about 90%.

Commercially available iodine-containing polarizing films 8 and 9 were respectively disposed on the external side of the dielectric multi-layer 5 and the quartz substrate 7 so as to interpose the dielectric multi-layers 5 and 6 between the polarizing films 8 and 9.

Thus, a magnetic recording medium No. 1 according to the present invention with such a structure as illustrated in FIG. 2 was fabricated.

The magneto-optical effect of the magnetic material layer 4 was measured using the magneto-optical effect measuring apparatus. As a result, the rotational angle of the plane of polarization was 24° when the light with a wavelength of 630 nm was employed, with the magnetic material layer 4 being magnetized by the application of a magnetic field of 15 kilogauss, followed by no application of magnetic field.

Since the magnetic material layer 4 was sandwiched between the dielectric multi-layers 5 and 6 in the above prepared magnetic recording medium No. 1, the energy of light incident on the magnetic recording medium No. 1 is localized on the magnetic material layer 4. As a result, the magneto-optical effect of the magnetic material layer 4 was enhanced and the rotational angle of the plane of polarization was increased.

An image was recorded in the recording medium No. 1 by applying a magnetic field to the magnetic recording medium No. 1 from the outside of the polarizing film 8 or 9 using a magnetic pen equipped with a permanent magnet having a diameter of 2 mm and a surface magnetic flux density of 3 kilogauss. An area of the magnetic material layer 4 corresponding to the image portion was thus magnetized. The magnetized image area appeared dark, thereby obtaining an image contrast of 1.8.

Alternatively, to record an image in the magnetic recording medium No. 1, the magnetic material layer 4 was entirely magnetized in a vertical direction, that is, in a downward direction. Thereafter, an area of the magnetic material layer corresponding to the image portion was magnetized in the opposite direction, that is, in the upward direction, using a magnetic pen equipped with a permanent magnet having a diameter of 2 mm and a surface magnetic flux density of 3 kilogauss. The image contrast obtained by this method was two times that obtained by the previously mentioned image recording method.

The polarizing films 8 and 9 were disposed with turning the direction of each polarizing film so as to obtain the maximum image contrast.

COMPARATIVE EXAMPLE 1

The procedure for fabrication of the magnetic recording medium No. 1 in Example 1 was repeated except that the dielectric multi-layers 5 and 6 employed in Example 1 were not provided on both surfaces of the quartz substrate 1.

Thus, a comparative magnetic recording medium No. 1 was fabricated.

An image was recorded in the comparative magnetic recording medium No. 1 by applying a magnetic field to the comparative magnetic recording medium No. 1 from the outside of the polarizing film 8 or 9 using the same magnetic pen as employed in Example 1. Thus, an area of the magnetic material layer 4 corresponding to the image portion was magnetized, and appeared dark, thereby obtaining an image contrast of 0.9.

EXAMPLE 2

The procedure for fabrication of the magnetic recording medium No. 1 in Example 1 was repeated except that the dielectric multi-layers 5 and 6, each prepared by alternately laminating the $SiO_2$ dielectric material layers and the $TiO_2$ dielectric material layers by ion-plating method in Example 1 were replaced by dielectric multi-layers 5 and 6, each prepared by alternately laminating a low-refractive index resin layer and a high-refractive index resin layer by a coating method, To be more specific, a commercially available one-pack type ultraviolet-curing epoxy resin (Trademark "Adeka Optomer KR567", made by Asahi Denka Kogyo K.K.) for the formation of the low-refractive index resin layer with a refractive index of 1.35, and a commercially available one-pack type ultraviolet-curing polyene polythiol resin (Trademark "BY-305", made by Asahi Denka Kogyo K.K.) for the formation of a high-refractive index layer with a refractive index of 1.57 were alternately coated by spin coating and cured by the application of a mercury lamp of 80 W/cm. In this case, the number of the above-mentioned laminated dielectric material layers was 20, and the total thickness of the dielectric multi-layer was 200 nm. The transmittance of the thus obtained dielectric multi-layer was 85%.

Thus, a magnetic recording medium No. 2 according to the present invention was fabricated.

An image was recorded in the magnetic recording medium No. 2 by applying a magnetic field to the magnetic recording medium No. 2 from the outside of the polarizing film 8 or 9 using the same magnetic pen as employed in Example 1. Thus, an area of the magnetic material layer 4 corresponding to the image portion was magnetized, and appeared dark, thereby obtaining an image contrast of 1.6.

EXAMPLE 3

The procedure for fabrication of the magnetic recording medium No. 1 in Example 1 was repeated except that the dielectric multi-layer 5 provided on the non-grooved surface of the substrate 1 in Example 1 was replaced by a light reflection layer with a thickness of about 200 nm made by aluminum, and that the polarizing film 8 employed in Example 1 was not provided.

Thus, a magnetic recording medium No. 3 according to the present invention with such a structure as shown in FIG. 3 was fabricated.

When the light entered the magnetic recording medium No. 3 from the side of the polarizing film 9, The light was trapped in a space between the dielectric multi-layer 6 and the light reflection layer 10, where multiple reflection took place. The incident light was turned into a linearly polarized light through the polarizing film 9. After the linearly polarized light thus obtained passed through the magnetized image area of the magnetic material layer, the plane of polarization was rotated. Thereafter the light was reflected by the light reflection layer 10, and the reflected light passed through the magnetized image area of the magnetic material layer 4 again. At that time, the plane of polarization was again rotated, so that the rotation angle was doubled. Due to the rotation of the plane of polarization, it became impossible for the light to pass through the polarizing film 9, whereby the magnetized image area appeared dark.

An image was recorded in the magnetic recording medium No. 3 by applying a magnetic field to-the magnetic recording medium No. 3 from the outside of the polarizing film 9 using the same magnetic pen as employed in Example 1. Thus, an area of the magnetic material layer 4 corresponding to the image portion was magnetized, and appeared dark, thereby obtaining an image contrast of 1.6.

As previously explained, image can be recorded in the magnetic recording medium, and in addition, the recorded image can be reproduced or erased from the recording medium using a magnetic head. Further, the magnetic recording medium of the present invention is applicable to the image display device capable of displaying the recorded image with a high image contrast.

What is claimed is:

1. A magnetic recording medium comprising:
    a transparent substrate with a surface and a plurality of grooves which extend parallel with each other at regular intervals, each of said grooves having inner side walls perpendicular to said transparent substrate surface and a space between adjacent side walls being constant,
    a magnetic material layer extending in the form of a stripe, provided on the surface of said inner side walls of each of said grooves, and
    a pair of dielectric multi-layers which are disposed so as to sandwich said transparent substrate therebetween.
2. The magnetic recording medium as claimed in claim 1, wherein each of said grooves has a depth of 0.1 to 5 gm.
3. The magnetic recording medium as claimed in claim 1, wherein said space between adjacent side walls is in a range of 0.2 to 2.0 $\mu$m.
4. The magnetic recording medium as claimed in claim 1, wherein said magnetic material layer has a thickness of 5 to 100 nm.
5. The magnetic recording medium as claimed in claim 1, wherein each of said grooves has a depth of 0.1 to 5 $\mu$m, said space between adjacent side walls is in a range of 0.2 to 2.0 $\mu$m, and said magnetic material layer has a thickness of 5 to 100 nm.
6. The magnetic recording medium as claimed in claim 1, further comprising a pair of polarizing layers, each disposed on an external side of each of said dielectric multi-layers.
7. The magnetic recording medium as claimed in claim 1, wherein said dielectric multi-layer comprises a plurality of laminated dielectric material layers.
8. The magnetic recording medium as claimed in claim 7, wherein said dielectric material layers comprise an organic material.
9. The magnetic recording medium as claimed in claim 1, wherein said magnetic material layer comprises a magnetic material selected from the group consisting of Fe, Co, Ni and an alloy thereof.
10. The magnetic recording medium as claimed in claim 9, wherein said magnetic material is in the form of ultrafine particles with an average particle diameter of 20 to 200 Å.
11. A magnetic recording medium comprising:
    a substrate with opposite surfaces and a plurality of grooves which extend parallel with each other at regular intervals, each of said grooves having inner side walls perpendicular to a substrate surface and a space between adjacent side walls being constant,
    a magnetic material layer extending in the form of a stripe, provided on the surface of said inner side walls of each of said grooves,
    a dielectric multi-layer which is provided on one surface of said substrate,
    a polarizing layer which is provided on said dielectric multi-layer, and
    a light reflection layer which is provided on the other surface of said substrate, opposite to said dielectric multi-layer with respect to said substrate.
12. The magnetic recording medium as claimed in claim 11, wherein each of said grooves has a depth of 0.1 to 5 $\mu$m.
13. The magnetic recording medium as claimed in claim 11, wherein said space between adjacent side walls is in a range of 0.2 to 2.0 $\mu$m.
14. The magnetic recording medium as claimed in claim 11, wherein said magnetic material layer has a thickness of 5 to 100 nm.
15. The magnetic recording medium as claimed in claim 11, wherein each of said grooves has a depth of 0.1 to 5 $\mu$m, said space between adjacent side walls is in a range of 0.2 to 2.0 $\mu$m, and said magnetic material layer has a thickness of 5 to 100 nm.
16. The magnetic recording medium as claimed in claim 11, wherein said dielectric multi-layer comprises a plurality of laminated dielectric material layers.
17. The magnetic recording medium as claimed in claim 16, wherein said dielectric material layers comprise an organic material.
18. The magnetic recording medium as claimed in claim 11, wherein said magnetic material layer comprises a magnetic material selected from the group consisting of Fe, Co, Ni and an alloy thereof.
19. The magnetic recording medium as claimed in claim 18, wherein said magnetic material is in the form of ultrafine particles with an average particle diameter of 20 to 200 Å.

* * * * *